(12) United States Patent
Tanaka et al.

(10) Patent No.: US 6,430,493 B2
(45) Date of Patent: Aug. 6, 2002

(54) VEHICULAR BRAKE CONTROL DEVICE

(75) Inventors: Wataru Tanaka, Anjo; Toshiaki Hamada, Okazaki; Hirofumi Nitta, Obu, all of (JP)

(73) Assignee: Aisen Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/814,055

(22) Filed: Mar. 22, 2001

(30) Foreign Application Priority Data

Mar. 22, 2000 (JP) ........................................ 2000-080969

(51) Int. Cl.$^7$ ............................................. G06F 19/00
(52) U.S. Cl. ................. 701/70; 701/78; 303/5; 303/11; 303/122.09
(58) Field of Search ................ 701/70, 71, 78; 303/11, 122.08, 122.09, DIG. 2, 30, 5

(56) References Cited

U.S. PATENT DOCUMENTS 5,558,414 A * 9/1996 Kubota .................. 303/122.08
5,868,473 A * 2/1999 Kato et al. ............. 303/122.09

FOREIGN PATENT DOCUMENTS

| DE | 197 03 776 | 8/1998 |
|----|------------|--------|
| JP | 7-246923 | 9/1995 |
| JP | 8-230634 | 9/1996 |

* cited by examiner

Primary Examiner—Yonel Beaulieu
(74) Attorney, Agent, or Firm—Burns, Doane, Swecker & Mathis, LLP

(57) ABSTRACT

A vehicular brake control device makes it possible to detect a failure or malfunction in closing an electromagnetic valve which is placed between a master cylinder and each of wheel cylinders. The vehicular brake control device includes a pressure application device which is capable of applying a hydraulic pressure automatically, i.e., regardless of a brake pedal depression, to each of wheel cylinders by way of a hydraulic pressure control device 17 from a master cylinder 20 and an ECU 18 which drives the pressure application unit 12 and the hydraulic pressure control device 17 to adjust a braking force of each of wheels. The hydraulic pressure control device 17 includes a set of pressure-maintaining and pressure-reducing valves for each wheel. The ECU 18 has a pressure application check division 77 which begins to check the pressure application at a predetermining timing.

4 Claims, 5 Drawing Sheets

76 : automatic pressure application control division
79 : pressure application unit abnormal judging portion
78 : pressure-maintain valve abnormal judging portion
80 : pump regenerative voltage check portion

VEHICULAR BRAKE CONTROL DEVICE

This application is based on and claims priority under 35 U.S.C. § 119 with respect to Japanese Application No. 2000-080969 filed on Mar. 22, 2000, the entire content of which is incorporated herein by reference.

FIELD OF THE INVENTION

The present invention is directed to a vehicular brake control device which makes it possible to apply a brake fluid pressure to each of wheel cylinders irrespective of a brake pedal operation.

BACKGROUND OF THE INVENTION

One of the prior art vehicular brake control devices of the kind, as is well known, includes a hydraulic pressure generation means which makes it possible to cause a master cylinder to generate a master cylinder pressure in response to a brake pedal depression force which is, for example, boosted by a booster, a hydraulic pressure supply means which supplies the master cylinder, as a brake fluid pressure, to a wheel brake cylinder of each of wheels, and a pressure application means which introduces a hydraulic pressure into a pressure application chamber in the hydraulic pressure supply means. In addition, the aforementioned known vehicular brake control device includes a control means which controls the pressure application means to automatically adjust the master cylinder pressure and which drives the hydraulic pressure supply means to control a braking force to be applied to each of the wheels. The hydraulic pressure generation means has a normally opened electromagnetic valve, as a pressure-maintaining valve, which establishes and interrupts a fluid communication between the master cylinder and each of the wheel cylinder and a normally closed electromagnet valve, as a pressure-decrease valve, which establishes and interrupts a fluid communication between the master cylinder and a reservoir.

In the foregoing conventional or prior art brake control device, when the master cylinder pressure is automatically increased, if the wheel cylinders are for front-wheels as driven wheels of an FR-vehicle under traction control, the pressure retaining valve is required to close which is provided between the master cylinder and each of such wheel cylinders in order to prevent an increase of the brake fluid pressure of each of the wheel cylinders.

However, if the pressure retaining valve malfunctions or has trouble remaining in its opened state, the wheel cylinder which is never increased in hydraulic pressure is pressurized. Thus, for example, despite traction control for starting or accelerating the vehicle, a problem occurs such as prevention of starting the vehicle due to the brake fluid application into the wheel cylinder, or so-called 'brake drag'.

Thus, a need exists to provide a vehicular brake control device, for overcoming the aforementioned problem, which make it possible to detect a malfunction of an electromagnetic valve wherein its opened state remains unchanged or can not be shifted to its closed state.

SUMMARY OF THE INVENTION

The present invention has been developed to satisfy the request noted above and a first aspect of the present invention is to provide a vehicular brake control device which comprises:

a master cylinder which is capable of generating a brake fluid pressure in response to a brake pedal depression force;

hydraulic pressure control means for controlling a brake fluid pressure which is transmitted from the master cylinder to each of wheel cylinders of respective wheels;

pressure application means which is capable of automatically applying a hydraulic pressure to each of the wheel cylinders independent of brake pedal depression by way of the hydraulic pressure control means; and control means for controlling a braking force of each of the wheels by driving the pressure application means and/or the hydraulic pressure control means, the hydraulic pressure control means including a first electromagnetic valve which establishes and interrupts fluid communication between the master cylinder and each of the wheel cylinders and a second electromagnetic valve which establishes and interrupts fluid communication between a reservoir and each of the wheel cylinders, the control means including pressure application check means which makes all the first electromagnetic valves of the respective wheels and all the second electromagnetic valves of the respective wheels closed and opened, respectively, at a predetermined timing and which initiates a pressure application check for judging whether or not automatic pressure application is made successfully by controlling the pressure application means, the pressure application check means having an electromagnetic valve abnormal condition judging means which judges that the first electromagnetic valve of one of the wheel cylinders fails to be kept opened if a changing rate of the hydraulic pressure applied by the pressure application means increases after a fixed duration (KT1) has elapsed from the initiation of the pressure application check.

In accordance with a first aspect of the present invention, the first electromagnetic valve and the second electromagnetic valve are closed and opened, respectively, if a failure or malfunction is found in closing the first electromagnetic valve (i.e., the first electromagnetic valve fails to shift from its open position to its closes position), the brake fluid flows into the reservoir through the second electromagnetic valve, the consumed amount of the brake fluid at each of the wheel cylinders increases. Thus, the increasing speed of the hydraulic pressure becomes slower which is introduced by the pressure application means after initiation of the pressure application check, which results in that immediately when the reservoir is filled with the brake fluid the increasing speed of the hydraulic pressure changes drastically, which is introduced by the pressure application means. Therefore, if a speed change is found to be increased in the increasing speed of the hydraulic pressure which is introduced by the pressure application means within a fixed time duration (KT1), measured from the initiation of the pressure application, the electromagnetic valve abnormal judging means makes it possible to detect, with great accuracy, a failure or malfunction in closing the first electromagnetic valve.

A second aspect of the present invention is to provide a vehicular brake control device, as a limited version of the first aspect, wherein the pressure application check means judges, if the master cylinder pressure increases to a predetermined value (KP1) before a fixed time duration (KT2) elapses after the initiation of the pressure application check, that the pressure application means and the first electromagnetic valve of each of the wheels are in normal condition.

In accordance with the second aspect of the present invention, if the hydraulic pressure which is introduced by the pressure application is increased to a fixed value (KP1) until a fixed time duration (KT2) elapses after initiation of the pressure application check, it becomes possible to judge that the pressure application means and the first electromagnetic valve of each of the wheels are in good order or in normal condition.

A third aspect of the present invention is to provide a vehicular brake control device, as a limited version of the first aspect, wherein the pressure application check means includes pressure application abnormal judging means and pump regenerative voltage check means, the pressure application abnormal judging means judging temporarily that the pressure application means is abnormal if more than a fixed time duration (KT2) from the initiation of the pressure application check is required for the master cylinder pressure to increase to a predetermined valve (KP1), the pump regenerative voltage check means driving a pump for a short time duration in order to suck the brake fluid, after the temporal judgment, which enters the reservoir by way of the second electromagnetic valve of each of the wheel cylinders, the pump regenerative voltage check means judging that if the regenerative voltage of the pump after its driving is less than a predetermined value (KVP) the first electromagnetic valve of one of the wheel cylinders fails to be kept open.

In accordance with the third aspect of the present invention, if the master cylinder pressure requires a fixed time duration (KT2) measured from the initiation of the pressure application check for reaching a predetermined value (KP1), it is impossible to judge whether the pressure application means is abnormal or the first electromagnetic valve is in failure in its closing operation. Thus, the pressure application means is temporarily judged to be abnormal. Thereafter, if the pump regenerative voltage is found to be not greater than the predetermined value (KVP) after driving the pump for a short time duration, the brake fluid flows into the reservoir by way of the second electromagnetic valve due to a failure or malfunction in the first electromagnetic valve, which makes it possible to judge that the pump inertia force of the pump upon its termination is used to discharge the brake fluid and therefore the pump regenerative voltage lowers temporarily. Thus, in such a case, it can be judged that a failure or malfunction is found in closing the first electromagnetic valve of any one of the wheel cylinders.

A fourth aspect of the present invention is to provide a vehicular brake control device, as a limited version of the third aspect, wherein the pump regenerative voltage check means judges that if the regenerative voltage of the pump after its driving is not less than the predetermined value (KVP), each of the first electromagnetic valves is normal and the pressure application means is abnormal.

In accordance with the fourth aspect of the present invention, if the regenerative voltage of the pump after its driving is not less than a fixed value (KVP) the first electromagnetic valve is normal and the brake fluid fails to flow into the reservoir by way of the second electromagnetic valve. Thus, the foregoing pump inertia force is not used to discharge the brake fluid when the pump stops, i.e., the pump has no load, which makes it possible to judge that the first electromagnetic valve is normal and the pressure application means is abnormal.

BRIEF DESCRIPTION OF THE DRAWINGS

The foregoing and additional features and characteristics of the present invention will become more apparent from the following detailed description considered with reference to the accompanying drawing figures in which like reference numerals designate like elements and wherein.

DETAILED DESCRIPTION OF THE PRESENT INVENTION

Hereinafter, a vehicular brake control device with automatic pressure application function in accordance with an embodiment of the present invention will be explained in detail with reference to FIGS. 1 to 4 inclusive.

Figure 1:
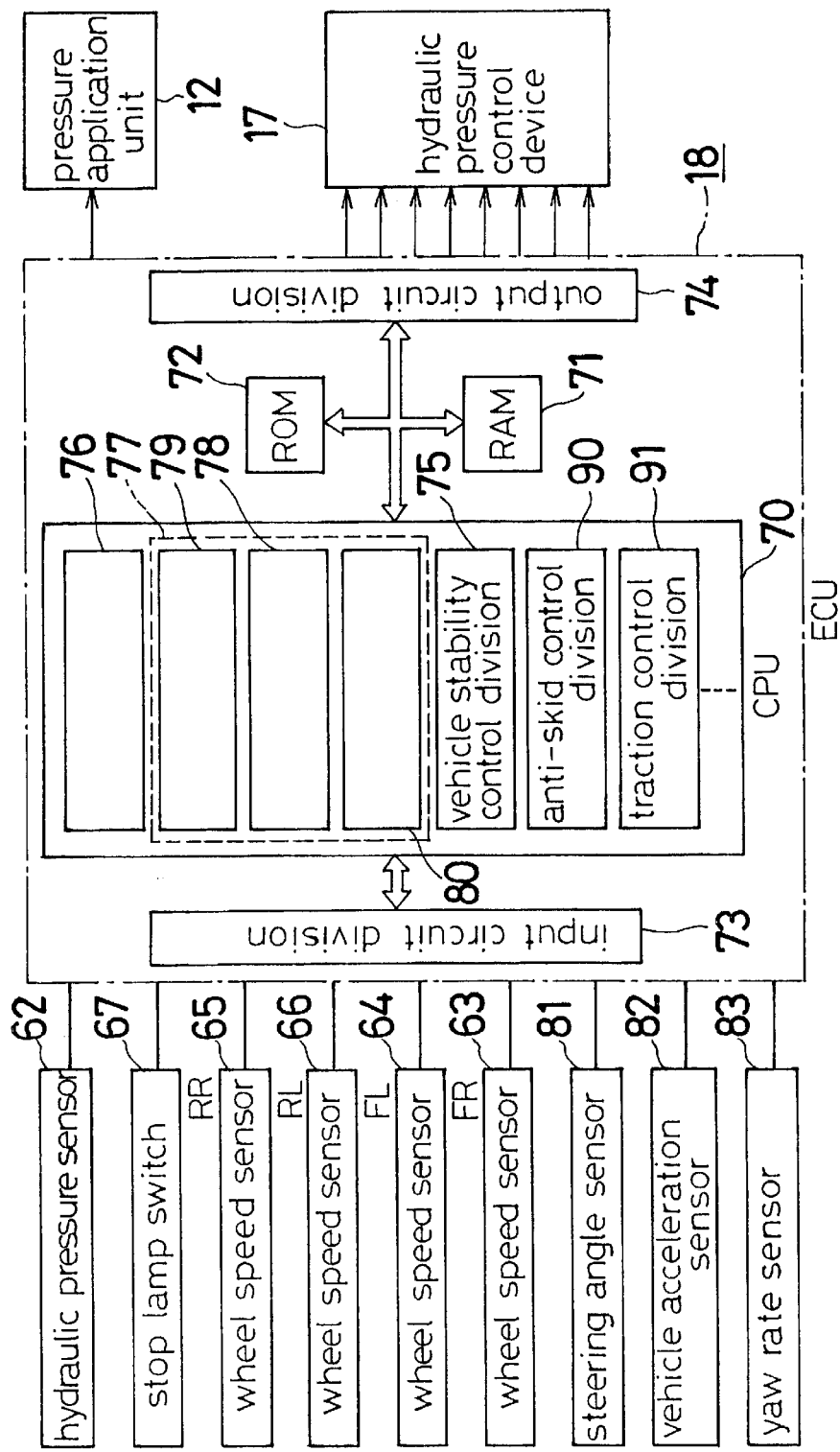
FIG. 1 illustrates a diagram of a vehicular brake control device in accordance with an embodiment of the present invention.
Figure 2:
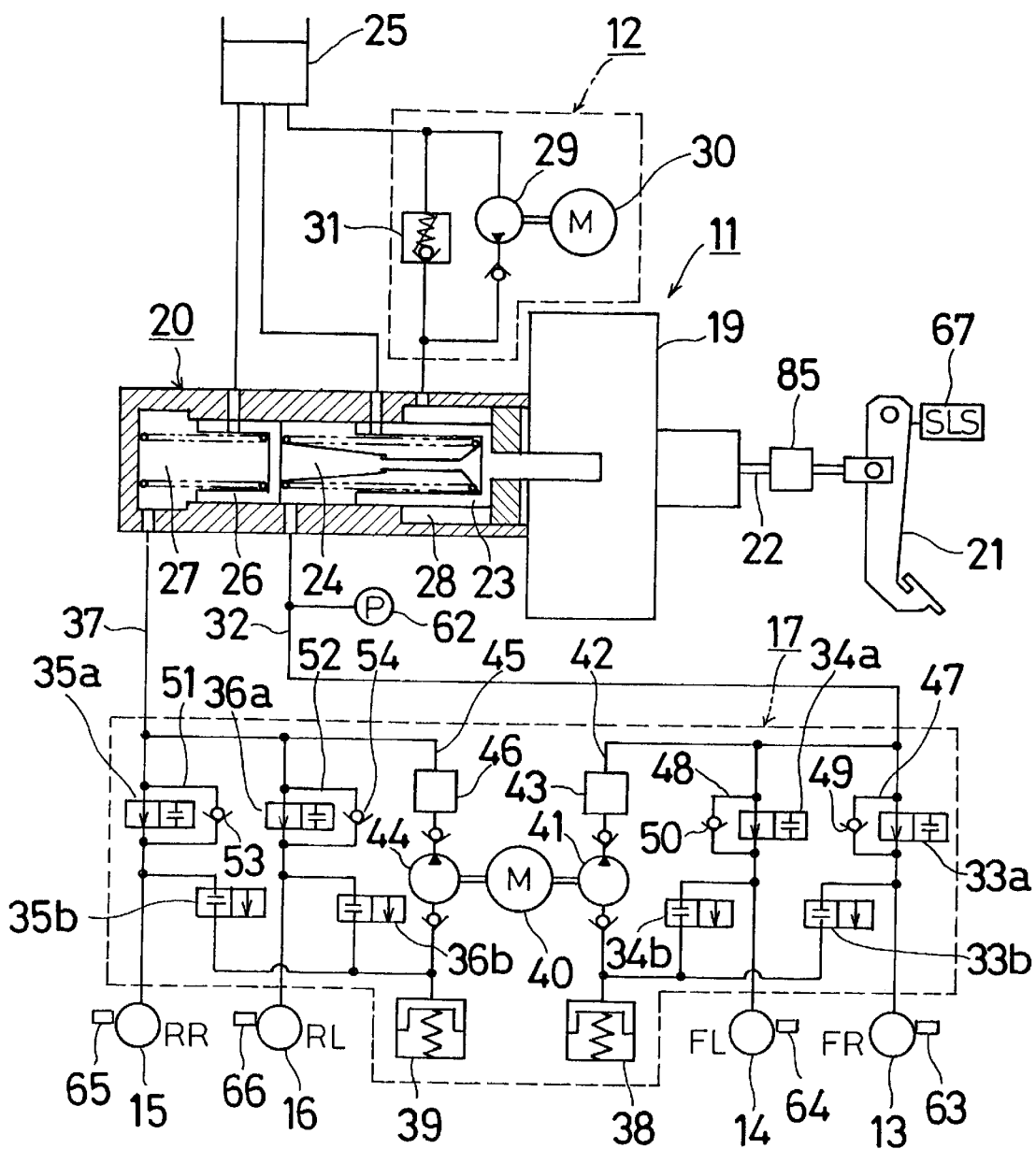
FIG. 2 illustrates a hydraulic pressure circuit diagram with which the vehicular brake control device shown in FIG. 1 is in association.

First of all, as shown in FIG. 2, the vehicular brake control device includes a pressure generating device 11 which generates and issues a brake fluid pressure and a pressure application unit 12 which automatically applies a hydraulic pressure to the pressure generating device 11. In addition, the vehicular brake control device includes a hydraulic pressure control device 17 which regulates the brake fluid pressure which is transmitted from the pressure generating device 11 to wheel cylinders 13, 14, 15, and 16 which are provided on a front-right wheel FR, a front-left wheel FL, a rear-right wheel FR, and a rear-left wheel RR, and a rear-left wheel RL, respectively, and an electronic control unit 18 (cf. FIG. 1) which controls braking forces of the respective front-right wheel FR, front-left wheel FL, rear-right wheel RR, and rear-left wheel RL.

The pressure generating device 11 has a vacuum booster 19 and a master cylinder 20. The master cylinder 20 is illustrated in a schematic fashion for simplification wherein seal members and other members are omitted. In the pressure generating device 11, when a brake pedal 21 is depressed, the resultant depression force is amplified at a lever ration in a link mechanism (not shown). Then, the amplified force is transmitted to an operating rod 22, thereby pushing the same. The force transmitted to the rod 22 is further amplified at the vacuum booster 19 and the resultant force is transmitted to a first piston 23 of the master cylinder 20. Then, the first piston 23 is urged in the left direction in FIG. 2 from the illustrated original position against a biasing force of a spring, which results in that a fluid communication between the reservoir 25 and a first pressure chamber 24 of the master cylinder 20 is interrupted, thereby generating or developing a hydraulic pressure in the first pressure chamber 24. The resultant hydraulic pressure urges a second piston 26 in the left direction in FIG. 2 from the original position against a biasing force of a spring, with the result that a fluid communication between the reservoir 25 and a second pressure chamber 27 of the master cylinder 20 is interrupted, thereby generating or developing a hydraulic pressure in the second pressure chamber 27.

Thus, when the first piston 23 is urged by the pedal depression force after being amplified by both the link mechanism and the vacuum booster 19, the brake fluid pressure, viz., a brake input pressure Pmcin is generated in the first pressure chamber 24 which depends on the pedal depression force. In addition, the brake fluid pressure generated in the first pressure chamber 23 urges the second piston 26 to generate the brake fluid pressure also in the second pressure chamber 27. It is to be noted that hereinafter the phrase 'the pressure increased at the vacuum booster 19' includes the lever-ratio amplified pressure at the link mechanism.

In addition, in the master cylinder 20, a third pressure chamber 28 is defined at a side of the first piston 23 which is opposed to the vacuum booster 19 in order to receive the hydraulic pressure generated at the pressure generate unit 12. When this hydraulic pressure or a third chamber pressure P3 causes the first piston 23 to move forward, a hydraulic pressure or a third chamber servo pressure Pmc3 is generated in the first pressure chamber 24 which is an amplification of the third chamber pressure P3 at a pressure receiving area ratio A of the first piston 23, where pressure receiving area ratio A is defined as a ratio between a pressure receiving area of the first piston which opposes the first pressure chamber 24 and a pressure receiving area of the first piston which opposes the third pressure chamber 28. Thus, the master cylinder 20 is expected to issue a master cylinder pressure Pmc which is made up two components: one is the pedal input pressure Pmc3 which depends on the pedal depression force which is amplified at the vacuum booster, the other is the third chamber pressure Pmc3 which depends on the hydraulic pressure which is fed from the pressure application unit 12.

The pressure application unit 12 includes a pump 29 which supplies a brake fluid stored in the reservoir 25 after pressurizing the brake fluid to the third pressure chamber 28, an electric motor 30 which drives the pump 29, and a linear valve 31 whose open degree changes and varies with a voltage value of an input signal (a control signal) in order to relieve the brake fluid under pressure which is discharged from the pump 29 to the reservoir 25. Thus, if the electronic control unit (ECU) 18 issues the control signal which is indicative of the current value to the linear valve 31, hydraulic-current characteristic (i.e., adjusting characteristic of pressure application) of the linear valve 31 causes the third pressure chamber 28 to introduce therein the hydraulic pressure which is in proportion to the value of the control signal (current value). This introduced hydraulic pressure is the difference between the pressure of the brake fluid discharged from the pump 29 and a pressure decrease of the brake fluid at the linear valve 31 which is discharged from the pump 29.

The brake fluid pressure generated at the master cylinder 20 is applied to the wheel cylinders by way of front-wheel side and rear-wheel side piping systems. That is, the hydraulic control device 17 which establishes fluid pressure control between the master cylinder 20 and each of the wheel cylinders 13 through 16 includes front and rear hydraulic circuits.

The brake fluid pressure generated at the first pressure chamber 24 of the master cylinder 20 is fed to a main passage 32 which is in fluid communication with the wheel cylinders 13 and 14 by way of the front hydraulic circuit. That is, the main passage 32 has two branching passages in which pressure-maintaining valves 33a and 34a are provided which are in fluid communication with the wheel cylinders 13 and 14, respectively. In addition, a passage between the wheel cylinder 13 and the pressure-maintaining valve 33a is in fluid communication with a reservoir 38 by way of a pressure-decrease valve 33b, while a passage between the wheel cylinder 14 and the pressure-maintaining valve 34a is in fluid communication with the reservoir 38 by way of a pressure-decrease valve 34b.

On the other hand, the brake fluid pressure generated at the second pressure chamber 27 of the master cylinder 20 is fed to a main passage 37 which is in fluid communication with the wheel cylinders 15 and 16 by way of the rear hydraulic circuit. That is, the main passage 37 has two branching passages in which pressure-maintaining valves 35a and 36a are provided which are in fluid communication with the wheel cylinders 15 and 16, respectively. In addition, a passage between the wheel cylinder 15 and the pressure-maintaining valve 35a is in fluid communication with a reservoir 39 by way of a pressure-decrease valve 35b, while a passage between the wheel cylinder 16 and the pressure-maintaining valve 36 is in fluid communication with the reservoir 39 by way of a pressure-decrease valve 36b.

Each of the pressure-maintaining valves 33a, 34a, 35a, and 36a is in the form of a normally opened electromagnetic valve, while each of the pressure-decrease valves 33b, 34b, 35b, and 36b is in the form of a normally closed electromagnetic valve. Each of these valves 33a, 34a, 35a, 36a, 33b, 34b, 35b, and 36b is made ON (energized) upon receipt of the hydraulic pressure control (control current) issued from the ECU 18.

Thus, in case where the pressure-maintaining valve 33a and the pressure-decrease valve 33b, which are for the front-right wheel FR which is explained representatively as an example, selected r43ecipon, while both the pressure-maintaining valve 33a and the pressure-decrease valve 33b are made OFF (deenergized), the wheel cylinder 13, which is isolated from the reservoir 38, is in fluid communication with the master cylinder 20, thereby making a wheel cylinder pressure-increase condition. Under a pressure-increase condition, the hydraulic pressure of the wheel cylinder 13 can be increased. While both the pressure-maintaining valve 33a and the pressure-decrease valve 33b are made ON (energized), the wheel cylinder 13, which is isolated from the master cylinder 20, is in fluid communication with the reservoir 38, thereby making a wheel cylinder 13 pressure-decrease condition. Under a pressure-decrease condition, the hydraulic pressure of the wheel cylinder 13 can be decreased. While the pressure-maintaining valve 33a and the pressure-decrease valve 33b are made ON (energized) and OFF (deenergized), respectively, the wheel cylinder 13 is isolated from both of the master cylinder 20 and the reservoir 38, thereby making a wheel cylinder 13 pressure-maintaining condition under which the brake fluid pressure in the wheel cylinder 13 is, without being increased or decreased, kept at a predetermined value.

Bringing each of the wheel cylinders into any one of the aforementioned three states can be made by changing the signal (ON or OFF) which is fed to the pressure-maintaining valve and the pressure-decrease valve which correspond to each of the wheel cylinders, which results in that the brake fluid pressure which is applied to each of the wheel cylinders 13, 14, 15, and 16 can be varied or adjusted, thereby making it possible to establish an individual braking force control for each of the wheels FR, FF, RF, and RR.

In the front hydraulic circuit, there are provided return passages 47 and 48 which makes it possible to return the brake fluid from the wheel cylinders 13 and 14, by passing the pressure-maintaining valves 33a and 34a, respectively, to the master cylinder 20. In the return passages, there are provided check valves 49 and 50 so that the brake fluid may not flow back to the wheel cylinders 13 and 14, respectively. Similarly, in the rear hydraulic circuit, there are provided return passages 51 and 52 which makes it possible to return the brake fluid from the wheel cylinders 15 and 16, by bypassing the pressure-maintaining valves 35a and 36a, respectively, to the master cylinder 20. In the return passages, there are provided check valves 53 and 54 so that the brake fluid may not flow back to the wheel cylinders 15 and 16, respectively.

In the main passage 32, there is provided a hydraulic pressure gauge or sensor 62 for determining the master cylinder pressure Pmc which is generated, as a brake fluid pressure, at the master cylinder 20. The wheels FR, FL, RR, and RL are provided with wheel speed sensors 63, 64, 65, and 66 for measuring wheel speeds thereof, respectively. The brake pedal 21 is in association with a stop lamp switch (SLS) 67. The stop lamp switch 67, which acts as a brake pedal depression detection means, issues a first signal (e.g. an ON signal) and a second signal OFF (e.g. OFF signal) when the brake pedal 21 is depressed and the brake pedal is released, respectively.

Referring back to FIG. 1 for explaining a detailed structure of the ECU 18, in response to or depending on the brake pedal depression force or a vehicle condition, the ECU 18 controls the braking force applied to each of the wheels by driving the ECU 18 and by causing the pressure application unit 12 to establish an automatic increase of the master cylinder pressure such that the pressure application unit 12 adjusts the control signal to be fed to the linear valve 31 which results in adjusting the hydraulic pressure to be introduced into the third pressure chamber 28 of the master cylinder 20 (the third pressure chamber pressure P3).

The ECU 18 is in the form of a micro-computer based electronic control device. In detail, the ECU 18 is made up of a CPU (Central Processing Unit) 70, a RAM (Random Access Memory) 71, a ROM (Read Only Memory) 72, an input circuit division 73, an output circuit division 74, and others.

The input circuit division 73 is connected with the hydraulic pressure sensor 62, the stop lamp switch 67, and the wheel speed sensors 63, 64, 65, and 66. In addition to these sensors, the input circuit division 73 is also connected with a steering angle sensor 81 which detects a steering angle, a vehicular acceleration sensor 82 which detects vehicle-body lengthwise and lateralwise accelerations, a yaw rate sensor 83 which detects a yaw rate of the vehicle body, and other devices. Moreover, the input circuit division 73 is connected with the motor 30 and the linear valve 31 of the pressure application unit 12, the pressure-maintaining valves 33a, 34a, 35a, and 36a and pressure-decrease valves 33b, 34b, 35b, and 36b, the motor 40, and others.

The ECU 18 includes a vehicle stability control division 75, an automatic pressure application control division 76, and a pressure application check division 77 as a pressure application check means. These divisions are designed to function on the basis of calculation results at the CPU 70.

The vehicle stability control division 75 executes vehicle stability control which controls the braking force of each of the wheels individually for decreasing a deviation of the vehicle body under, e.g., steering for turn from a target line to be as small as possible on the basis of a vehicle condition which is detected by the wheel speed sensors 63–66, the sensors 81–83, and others such as a vehicle condition (vehicle condition amount) under steering for turn. For such a purpose, the vehicle stability control division 75, depending on the detected vehicle condition amount, controls the motor 30 of the pressure application unit 12 and an amount of the control signal (current amount I) to be supplied to the linear valve 31 of the pressure control unit 12. Simultaneously, the vehicle stability control division 75 controls the pressure-maintaining valves 33a, 34a, 35a, and 36a, and the pressure-decrease valves 33b, 34b, 35b, and 36b, and others.

Other than the vehicle stability control division 75, the ECU 18 includes an anti-skid control division 90 and a traction control division 91. The anti-skid control division 90, for the purpose of preventing the wheel from being locked upon brake application, controls the hydraulic pressure control device 17 so as to adjust the braking force to be applied to each of the wheels. The traction control device 91, for preventing the driving wheels from slipping when the vehicle is driven, controls the pressure application unit 12 and the hydraulic pressure device 17 for applying braking force to each of the driving wheels.

The automatic pressure application control division 76 causes, when it controls the control signal to be fed to the linear valve 31 of the pressure application unit 12, the pressure application unit 12 to adjust the hydraulic pressure introduced into the third pressure chamber 28 of the master cylinder (the third chamber pressure P3) for establishing an automatic pressure application of the master cylinder pressure. For such a purpose, the automatic pressure application control division 76 adjusts the hydraulic pressure (the third chamber pressure P3) above a maximum master cylinder pressure Pmc which is obtained when the vacuum booster 19 is operated by the fully depressed brake pedal 21 and automatically adjusts the master cylinder pressure Pmc by the third chamber servo pressure Pmc3 which depends on the resulting hydraulic pressure.

The pressure application check division 77 checks whether or not the aforementioned automatic pressure application is made, at a predetermined timing, when the vehicle begins to travel, on the basis of an output signal from the stop lamp switch 67 and the master cylinder pressure Pmc which is detected by the hydraulic pressure sensor 62. In detail, when the vehicle begins to travel, the pressure application check division 77 controls the pressure application unit 12 to increase the master cylinder pressure by closing all of the pressure-maintaining valves 33a, 34a, 35a, and 36a which constitutes a first electromagnetic valve device and by opening all of the pressure-decrease valves 33b, 34b, 35b, and 36b which constitute a second electromagnetic valve device, thereby beginning to check whether or not the foregoing automatic pressure application is established.

The pressure application check division 77 has a pressure-maintaining valve abnormal judging portion 78 which judges whether one of the pressure-maintaining valves 33a, 34a, 35a, and 36a of the respective wheels is in failure in the closing movement during the changing speed of the master cylinder pressure when a fixed time duration (KIT) elapses after initiation of the pressure application check.

The pressure application check division 77 also has a pressure unit abnormal judging portion 79, as a pressure application abnormal judging means, which temporarily judges that the pressure application unit 12 is abnormal or malfunctioning when a fixed time duration (KT2) is required after initiation of the pressure application check for the master cylinder to reach a predetermined value (KP1). Moreover, the pressure application check division 77 has a pump regenerative voltage check means, which judges, subsequent to the temporary judgment, that one of the pressure-maintaining valves 33a, 34a, 35a, and 36a of the respective wheels is in failure in the closing movement when a pump regenerative voltage is less than a predetermined value (KW) after driving the pump 41 (42) for a short time, during which the pump sucks the brake fluid from the reservoir 38 (39) which has flowed therein from the pressure-decrease valves (i.e. the second electromagnetic valve device) 33*b* and 34*b* (35*b* and 36*b*).

Hereinafter, with reference to FIGS. 3 to 5 inclusive, an operation of the vehicular brake control device according to the present embodiment will be described, together with an explanation of a content which is executed by the ECU 18.

Figure 3:
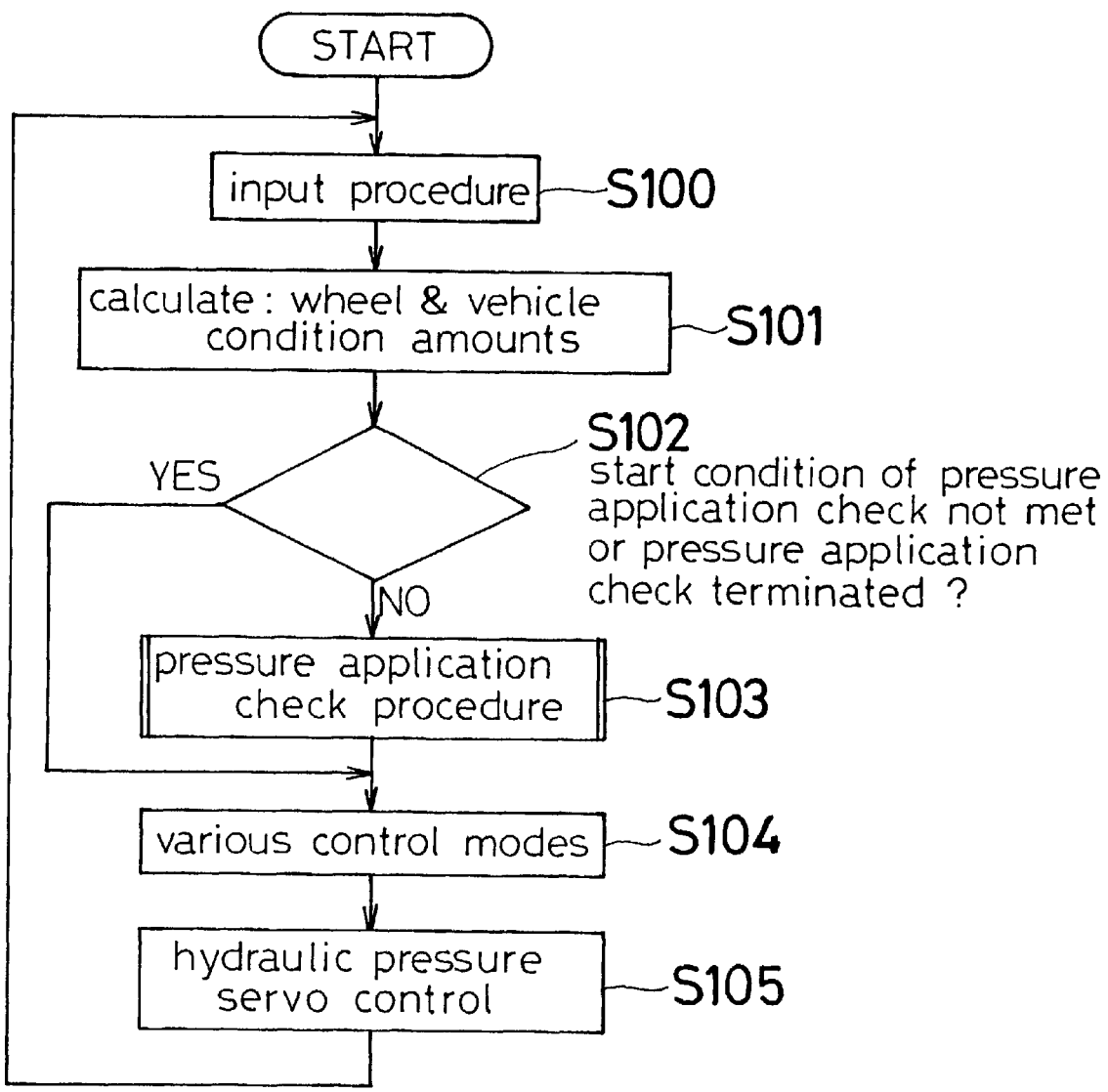
FIG. 3 illustrates a flowchart which is indicative of how the vehicular brake control device, which is shown in FIG. 1, operates.

A main routine, which follows a flowchart shown in FIG. 3, starts upon engine starts-up which results from turning on a vehicular ignition switch (not shown). After doing a required initialization, at step S100, an input procedure and a calculate procedure are executed in such a manner that the input procedure reads the signals from the hydraulic pressure sensor 62, the stop lamp switch 67, the wheel speed sensors 63, 64, 65 and 66, the steering angle sensor 81, the vehicular acceleration sensor 82, the yaw rate sensor 83, and other sensors, and the calculate procedure calculates a master cylinder pressure change speed dPmc according to the following formula:

$$dPmc=Pmc'-Pmc$$

where Pmc' and Pmc are the current and the latest master cylinder pressures.

Next, at step S101, wheel and vehicular condition amounts are calculated such as a wheel speed of each wheel, a wheel acceleration of each wheel, each estimated vehicle body speed at a vehicle position, and a real slip rate of each wheel.

Thereafter, the control goes to step S102, where it is checked whether the initiation condition of the pressure application check is checked or the pressure application check has been terminated. If the result is false (NO) and true (YES), step S103 is executed and step S104 is executed by jumping step S103, respectively.

The initial condition of the pressure application check is established at a timing when the stop lamp switch 67 is made OFF by releasing the brake pedal 21 while the brake pedal 21 is being depressed which causes the stop lamp 67 to be made ON after turning on the ignition switch for starting the vehicle. Thus, so long as the brake pedal 21 is being depressed, the initiation cognition fails to be established. In addition, the termination of the pressure application check means that a flag is set (e.g. the flag is made '1') for indicating that the pressure application has been terminated.

Figure 4:
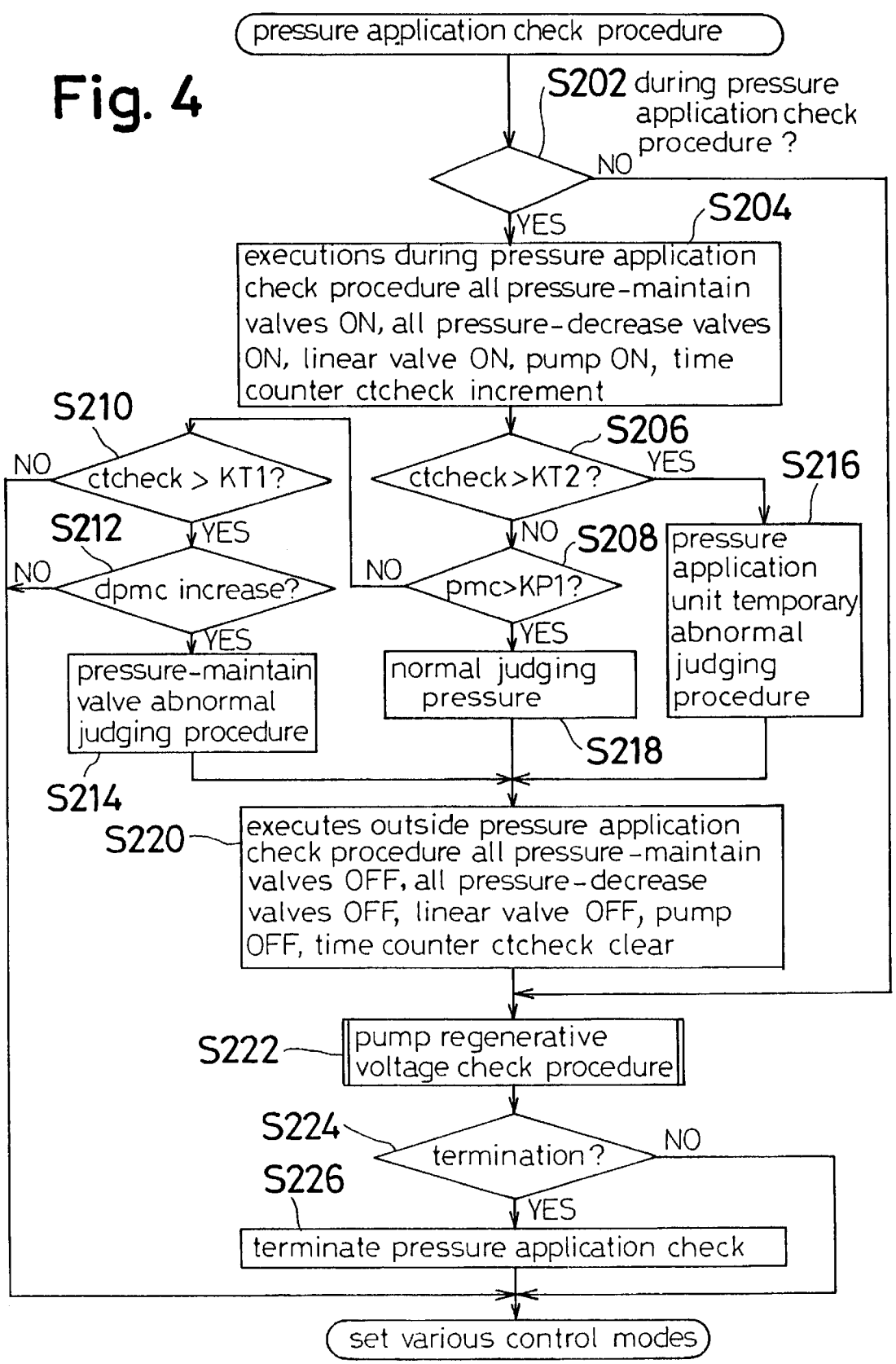
FIG. 4 illustrates a flowchart of a sub-routine shown in FIG. 3.

Now, the brake pedal 21 is released for starting the vehicle, the initiation condition of the pressure application check is established, which makes the pressure application check termination flag '0', and the control goes to step S103 to perform a pressure application check procedure whose flowchart is depicted in FIG. 4.

In the pressure application check procedure, as the flowchart in FIG. 4 shows, first of all, at step S202, it is checked whether or not the pressure application check is being made. If so, the control goes to step S204. If not, i.e., if the pressure application procedure has been terminated, the control goes to step S222.

Since the pressure application is now being made, the control goes to step S204, at which all of the pressure-maintaining valves 33*a*, 34*a*, 35*a*, and 36*a* of the respective wheels are energized to close, all of the pressure-decrease valves 33*b*, 34*b*, 35*b*, and 36*b* of the respective wheels are energized to open, the control current to the linear valve 31 is caused to increase, the pump 29 is driven (i.e., is made ON) by the motor 30, and a timer CTCHECK is initiated to increase or count-up while the pressure application check. Thus at step S204, the brake fluid is prevented from being fed to each of the wheel cylinders 13, 14, 15, and 16 by closing all of the pressure-maintaining valves 33*a*, 34*a*, 35*a*, and 36*a* of the respective wheels, the pressure-decrease valves 33*b*, 34*b*, 35*b*, and 36*b* of the respective wheel are opened, and concurrently the pressure application unit 12 is controlled to increase the master cylinder pressure, which results in the initiation of the automatic pressure application. Thus, during the resultant condition, the master cylinder pressure increases speed while the resultant condition becomes later than that while the pressure-decrease valves 33*b*, 34*b*, 35*b*, and 36*b* are being closed. This means that the slope of the pressure increase is decreased.

Thereafter, at step S206, it is checked whether or not the fixed time duration KT2 has elapsed from the initiation of the pressure application check, i.e., the count value of the counter CTCHECK is in excess of KT2. If the result is false, the control goes to step S208. If the result is true, the control goes to step S216.

If the control goes to step S208 before the fixed time duration KT2 has not elapsed when measured from the initiation of the pressure application check, it is checked whether or not the master cylinder pressure is in excess of the predetermined value KP1. If the master cylinder pressure Pmc is equal to or less than the predetermined value KP1, the control goes to step S218. When, just after the pressure application check, the master cylinder pressure Pmc is low, the control goes from step S208 to step S210.

At this step S210, it is checked whether or not the fixed time duration KT1 has been elapsed from the initiation of the pressure application check, i.e., the count value of the counter CTCHECK is in excess of KT1 (KT1<KT2). If the count value of the counter CTCHECK is less than or equal to KT1, the control goes to step S104. If the count value of the counter CTCHECK is in excess of KT1, the control goes to step S212.

At step S104 which is to be executed when the counter CTCHECK indicates a value of not greater than KT1, a control mode, such as anti-skid control and its corresponding slip rate, are set.

Thereafter, the control goes to step S105. In a hydraulic pressure servo control at step S105, in response to the set control mode, the pressure application unit 12 and the hydraulic pressure control device 17 are so driven as to control the braking force to be applied to each of the wheels. Thereafter, the control returns to step S100 to execute steps S100, S101, and S102. At step S102, if the aforementioned pressure application check initiation condition is not established, which is indicates the pressure application check procedure is being made, the control goes step S103 to continue pressure application check procedure.

In the pressure application check procedure, after executing steps S202, S204, and S206, at step S208, if the fixed time duration KT1 elapses from the initiation of the pressure application check before the master cylinder pressure exceeds the fixed value KP1 and the fixed time duration KT2 elapses the, control goes to step S212 from step S210.

At this step S212, it is checked whether or not an increase is found in the master cylinder pressure change speed dPmc which is calculated at step S100. If the result is true and false, the control goes to step S214 and step S104, respectively. In detail, if the master cylinder pressure change speed dPmc is found to have increased, this indicates that the master cylinder pressure change speed dPmc has rapidly increased immediately upon a full brake fluid introduction into the reservoir 38 and/or the reservoir 39 by way of the pressure-decrease valves 33b, 34b, 35b, and/or 36b resulting from a failure or malfunction in closing at least one of the pressure-maintaining valves 33a, 34a, 35a, and/or 36a. Thus, if the fixed time duration KT1 elapses and the master cylinder pressure change speed dPmc is increased until the master cylinder pressure Pmc reaches the predetermined value KP1, the control goes to step S214 from step S212.

At step S214, a pressure-maintaining valve abnormal condition judging procedure 3 is executed. In this procedure, when a failure or malfunction is judged in closing at least one of the pressure-maintaining valves 33a, 34a, 35a, and 36a, a procedure is made which causes a lamp to be lit for indicating the resultant malfunction to a driver along with setting an inhibit flag, and an inhibit procedure is made for inhibiting the control in each control mode. Thereafter, the control goes to step S220.

In addition, during the pressure application check, if the master cylinder pressure Pmc exceeds the predetermined value KP1 before elapse of the fixed time duration KT2 when measured from the initiation of the pressure application check, the automatic pressure application is considered to be normal or made successfully by the pressure application unit 12 and others. Thus, in such a case, the control goes from step S208 to step S220 by way of stop S218 which executes a procedure which is indicative of the normal or successful automatic pressure application.

If an elapse of the predetermined time duration KT2 is found before the master cylinder pressure Pmc exceeds the fixed value KP1, it is impossible to detect whether a malfunction of the pressure application unit 12 or malfunction in closing at least one of the pressure-maintaining valves 33a, 34a, 35a, and 36a causes the unsuccessful execution of the automatic pressure application. Thus, in such a case, the control goes to from step S206 to S220 by way of step S216 in which the pressure application unit 12 is judged to be temporarily abnormal.

It is to be noted that, during the pressure application check procedure step, S220 is also executed when the result of step S202 is false or NO, rather than execution of one of steps S214, S216, and S218.

At step S220, an outside pressure application procedure is executed. In this outside pressure application procedure, all of the pressure-maintaining valves 33a, 34a, 35a, and 36a of the respective four wheels are de-energized (made OFF) to open, all of the pressure-decrease valves 33b, 34b, 35b, and 36b of the respective four wheels are de-energized (made OFF) to close, outputting of the control signal to the linear valve 31 is interrupted (made OFF), the pump 29 is terminated (made OFF), and the timer counter CTCHECK is rest. Thereafter, the control goes to step S222 to execute a pump regenerative voltage procedure.

In this pump regenerative voltage procedure, step S300 shown in the flowchart in FIG. 3 determines, on the basis of the result of step S216, whether or not the pressure application unit 12 is found to be temporarily abnormal or not. If the result of step S300 indicates that the pressure application unit 12 is temporarily abnormal, the control goes to step S304. If not, i.e., the step 300 is executed after executing steps S202, S214 (or S218), S220 and S222, the control goes to step S302 to reset or clear a pump regenerative voltage check timer counter CTPCHECK.

At step S304, it is checked whether or not a pump regenerative voltage check is terminated. If the result is true, the control terminates the routine depicted in FIG. 5 to return to step S104 shown in FIG. 3. If not, the control goes to step S306.

At step S306, the pump regenerative voltage check timer counter CTPCHECK is incremented or is initiated to count. Then the control goes to step S308. At this step S308, it is checked whether or not the pump regenerative voltage check timer counter CTPCHECK is indicative of a first fixed value KPT1. When, just after initiation of the pump regenerative voltage check timer counter, its indication is less than the value KPT1, the control goes to step S310 to cause the motor 40 to drive or turn on the pumps 41 and 44.

After this driving operation, if the indication of the pump regenerative voltage check timer CTPCHECK is equal to or greater than the first fixed value KPT1, the control goes from step S308 to step S312 to check whether or not the indication of the pump regenerative voltage check timer CTPCHECK is less than a second fixed value KPT2. When, that just after that the indication of the pump regenerative voltage check timer CTPCHECK reaches the first fixed value KPT1, the indication of the pump regenerative voltage check timer CTPCHECK is less than the second fixed value KPT2, the control goes to step 314 to terminate or turn off the pumps 41 and 44.

Thereafter, if the indication of the pump regenerative voltage check timer CTPCHECK is in excess of the second fixed value KPT2, the control goes from step S312 to step S316 to check whether or not a pump regenerative voltage Vpomp is less than a predetermined value KVP.

Executing steps S308, S310, S312, S314, and S316 activates the pumps 41 and 44 for a short time period which is substantially equal to the fixed value KPT1 after initiation of the increment of the timer counter CTPCHECK, and the resulting pump regenerative voltage Vpomp is compared to the fixed value KPT1. It is to be noted that the pump regenerative voltage Vpomp is a monitoring value which is indicative of the voltage at an upstream side of each of the pumps 41 and 44.

Due to a full brake fluid introduction into the reservoir 38 and/or the reservoir 39 by way of the pressure-decrease valves 33b, 34b, 35b, and/or 36b resulting from a failure or malfunction in closing at least one of the pressure-maintaining valves 33a, 34a, 35a, and/or 36a, the inertia force of each of the pumps 41 and 44 upon termination thereof is used to discharge (i.e. suck) the brake fluid, which causes the pump regenerative voltage Vpomp to lower temporarily, resulting in that the pump regenerative voltage Vpomp is made less than the fixed value KVP. Thus, in such a case, the control goes from step S316 to S318 during the failure or malfunction in closing at least one of the pressure-maintaining valves 33a, 34a, 35a, and 36a of the respective wheel cylinders 13, 14, 15, and 16, and a procedure is executed to indicate the detected malfunction to the driver by lighting a lamp and set an inhibit flag, and a procedure is executed to inhibit subsequent each of various control modes. Thereafter, the control goes to step S322 to terminate the pump regenerative voltage check procedure.

This termination makes the result of step S224 shown in FIG. 4 YES and the control goes to step S226 to execute a pressure application check termination procedure, in which a pressure application termination flag is set (i.e., is made '1'). Thereafter, the control goes to step S104 (FIG. 3).

On the other hand, if the pump regenerative voltage Vpomp is equal to or greater than the fixed value KVP, no failure or no malfunction is detected in closing the pressure-maintaining valves 33a, 34a, 35a, and 36a, which fails to introduce the brake fluid into the reservoir 38 by way of the in-series pressure-maintaining valve 33a and the pressure-decrease valve 33b, and by way of the in-series pressure-maintaining valve 34a and the pressure-decrease valve 34b, and which fails to introduce the brake fluid into the reservoir 39 by way of the in-series pressure-maintaining valve 35a and the pressure-decrease valve 35b, and by way of the in-series pressure-maintaining valve 36a and the pressure-decrease valve 36b. Thus, no brake fluid is stored in both the reservoirs 38 and 39, respectively, which results in that at termination of driving of each of the pumps 41 and 44, the inertia force thereof is not used for sucking the brake fluid (i.e. each pump is of no load), thereby not lowering the pump recovery voltage Vpomp temporarily. Therefore, in such a case, the control goes from step S316 to step S320, when it is judged that each of the pressure-maintaining valves 33a, 34a, 35a, and 36a is in good order but the pressure application unit 12 is in malfunction, a procedure is executed to indicate the detected malfunction of the pressure application unit 12 to the driver by lighting a lamp and set an inhibit flag, and a procedure is executed to inhibit each of various subsequent control modes. Thereafter, the control goes to step S322 to terminate the pump regenerative voltage check procedure.

As explained above, upon starting the vehicle, the pressure application check procedure and the pump regenerative voltage check procedure are executed and, after executing the pressure application check termination procedure at step S226 in FIG. 4, the routine depicted in FIG. 3 is performed for doing various controls depending on the vehicle conditions during vehicle movement such that steps in FIG. 3, except for step S102, are executed.

The aforementioned vehicular brake control device in accordance with the present embodiment provides the following advantages.

If an increase is found in the master cylinder pressure change speed dPmc after elapse of the fixed time duration KT1 when measured from the initiation of the pressure application check (i.e., if the result of step S110 is YES), it become possible to judge a failure or malfunction in closing at least any one of the pressure-maintaining valves 33a, 34a, 35a, and 36a.

Thus, detecting such the failure or malfunction makes it possible to issue an alarm to the driver by lighting a lamp and to inhibit a control in each of various modes. This means that drawbacks can be prevented in advance, such as an impossibility of starting a vehicle due to brake fluid pressure application to a wheel cylinder for a wheel (e.g. a front wheel as the driven wheel of FR vehicle which is in traction control) and the brake fluid application into the wheel cylinder or so-called 'brake drag'.

During the pressure application check procedure (i.e., upon initiation of the pressure application check) which is indicated at step S204 in FIG. 4, the pressure-decrease valves 33b, 34, 35b, and 36b of the respective wheel cylinders 13, 14, 15, and 16 are opened while the pressure-maintaining valves 33a, 34a, 35a, and 36b are closed, and the consumed amount of brake fluid in each of the wheel cylinders 13, 14, 15, and 16 increases. Thus, the master cylinder pressure increasing speed becomes slower (i.e. the slope of pressure increase is lowered), which makes it possible to increase detecting accuracy of a failure or malfunction in closing the pressure-maintaining valves 33a, 34a, 35a, and 36a.

If the master pressure is in excess of the predetermined value KP1 (i.e. if the result of step S208 is YES) before the timer CTCHECK indicates it has reached the second predetermined value KT2 when measured from the initiation of the pressure application check, which is indicative of the successful or normal execution of the automatic master cylinder pressure application, it is thereby possible to judge the condition of the pressure application unit 12 and each of the pressure-maintaining valves 33a, 34a, 35a, and 36a of the respective wheels.

If the timer counter indicates more than the second predetermined time duration KT2 (i.e. if the result of step S206 is YES), it is not impossible to make a decision whether the pressure application unit 12 is in malfunction or each of the pressure-maintaining valves 33a, 34a, 35a, and 36a is in failure in its closing operation, thereby making a temporary decision that the pressure application unit 12 is in malfunction. Then, the pumps 41 and 44 are driven for a short time duration and thereafter, if the resultant pump regenerative voltage Vpomp is smaller than the fixed value KVP (i.e., the result of step S316 in FIG. 5 is YES), at least one of the pressure-maintaining valves 33a, 34a, 35a, and 36a can be found in failure in its closing operation.

Figure 5:
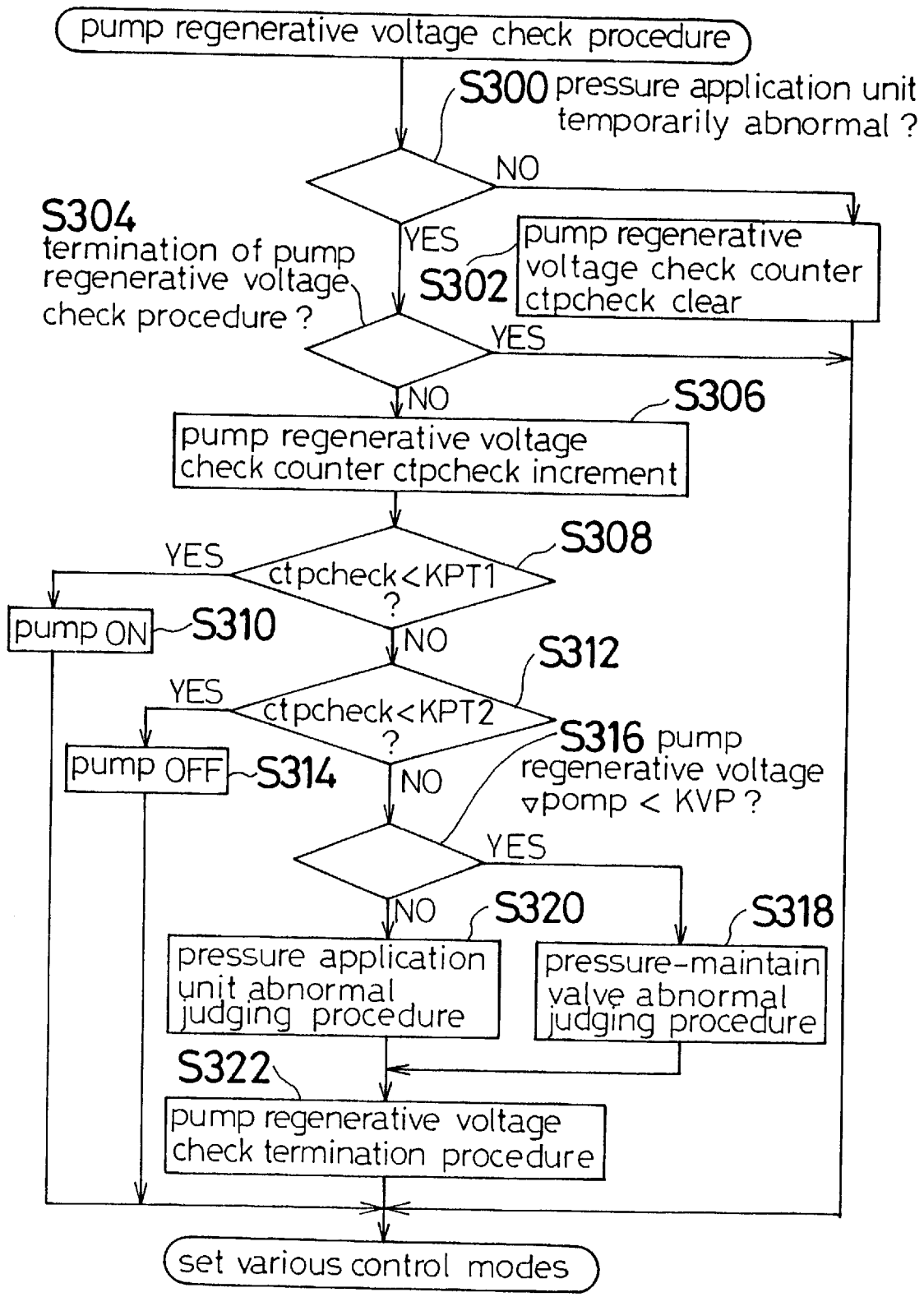
FIG. 5 illustrates a flowchart of a sub-routine shown in FIG. 4.

If the resultant pump regenerative voltage Vpomp is in excess of the fixed value KVP (i.e. the result of step S316 in FIG. 5 is NO), it is possible to judge whether the pressure application unit 12 is in malfunction.

MODIFICATIONS

The present invention allows the aforementioned embodiment to be modified as follows.

In the foregoing embodiment, it is possible to light a lamp for indicating the result of each of steps S318 and S320 in FIG. 5.

The pressure application unit is not limited to the aforementioned unit 12 and any type of pressure application unit is available so long as it makes it possible to establish an automatic control of the master cylinder pressure by being controlled by the ECU 18.

Instead of the stop lamp switch 67 as a means for the depression of the brake pedal 21, other structures are available such as stroke sensor which is made ON after the brake pedal 21 strokes through a distance and a depression force sensor which is in the form of a gauge sensor which outputs an ON-signal when the operating rod 22 is applied with a depression force whose magnitude is equal to or greater than a fixed value.

Instead of the front and rear piping in the hydraulic pressure control device 17 which connects the master cylinder 20 to each of the wheel cylinders 13, 14, 15, and 16 of the respective wheels in the foregoing embodiment, a diagonal piping is available.

Instead of the tandem type master cylinder 20 in the foregoing embodiment, a single type master cylinder is available.

Instead of the pressure application unit 12 which applies a hydraulic pressure to the master cylinder pressure, another pressure application unit is available which is disclosed in one of Japanese Patent Laid-Open Print No. Hei. 7(1995)-246923 and Japanese Patent Laid-Open Print No. Hei. 8(1996)-230634 in order to detect a failure or malfunction of each of the pressure-maintaining valves in its closing operation.

ADVANTAGES OF THE PRESENT INVENTION

As apparent from the foregoing description, it is possible to detect a failure or malfunction in closing the first electromagnetic valve which is disposed between the master cylinder and each of the wheel cylinders of the respective wheels. In addition, opening the second electromagnetic valve makes lower the increasing speed of the introduced hydraulic pressure (i.e. the pressure increase slope declines), thereby increasing the accuracy in judging whether or not the pressure-maintaining valve is in failure in its closing operation.

In accordance with another aspect of the present invention, it is possible to judge that the pressure application means and the first electromagnetic valve of each of the wheels are in good order or in normal condition.

In accordance with another aspect of the present invention, it is possible to judge a failure or malfunction in closing the first electromagnetic valve of each of the wheel cylinders of the respective wheel.

In accordance with yet another aspect of the present invention, it is possible to judge that the pressure application means is in an abnormal condition or in malfunction and the first electromagnetic valve of each of the wheels is in good order or in normal condition.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby. Each of the aforementioned documents are incorporated by reference herein in their entireties.

What is claimed is:

1. A vehicular brake control device comprising:

a master cylinder which is capable of generating a brake fluid pressure in response to a brake pedal depression force;

hydraulic pressure control means for controlling a brake fluid pressure which is transmitted from the master cylinder to each of wheel cylinders of respective wheels;

pressure application means for automatically applying a hydraulic pressure to each of the wheel cylinders independent of a brake pedal depression by way of the hydraulic pressure control means: and control means for controlling a braking force of each of the wheels by driving the pressure application means, the hydraulic pressure control means, or both, the hydraulic pressure control means including a first electromagnetic valve for establishing and interrupting fluid communication between the master cylinder and each of the wheel cylinders and a second electromagnetic valve for establishing and interrupting fluid communication between a reservoir and each of the wheel cylinders, the control means including pressure application check means for making all the first electromagnetic valves of the respective wheels and all the second electromagnetic valves of the respective wheels closed and opened, respectively, at a predetermined timing and for initiating a pressure application check for judging whether or not the automatic pressure application is made successfully by controlling the pressure application means, the pressure application check means including electromagnetic valve abnormal condition judging means for judging whether the first electromagnetic valve of one of the wheel cylinders fails to be kept opened if the rate of change of the hydraulic pressure applied by the pressure application means increases after an elapse of a fixed time duration (KT1) from the initiation of the pressure application check.

2. A vehicular brake control device as set forth in claim 1, wherein the pressure application check means judges, if the master cylinder pressure increases to a predetermined value (KP1) before a fixed time duration (KT2) elapses after the initiation of the pressure application check, whether the pressure application means and the first electromagnetic valve of each of the wheels are in normal condition.

3. A vehicular brake control device as set forth in claim 1, wherein the pressure application check means includes pressure application abnormal judging means and pump regenerative voltage check means, the pressure application abnormal judging means judging temporarily whether the pressure application means is abnormal if more than a fixed time duration (KT2) from the initiation of the pressure application check is required for the master cylinder pressure to increase to a predetermined value (KP1), the pump regenerative voltage check means driving a pump for a short time duration in order to suck the brake fluid, after the temporal judgment, which enters the reservoir by way of the second electromagnetic valve of each of the wheel cylinders, the pump regenerative voltage check means judging whether, if the regenerative voltage of the pump after its driving is less than a predetermined value (KVP), the first electromagnetic valve of one of the wheel cylinders fails to be kept open.

4. A vehicular brake control device as set forth in claim 3, wherein the pump regenerative voltage check means judges whether, if the regenerative voltage of the pump after its driving is not less than the predetermined value (KVP), each of the first electromagnetic valves is normal and the pressure application means is abnormal.

* * * * *

UNITED STATES PATENT AND TRADEMARK OFFICE
CERTIFICATE OF CORRECTION

PATENT NO.     : 6,430,493 B2  Page 1 of 1
DATED          : August 6, 2002
INVENTOR(S)    : Wataru Tanaka et al.

It is certified that error appears in the above-identified patent and that said Letters Patent is hereby corrected as shown below:

<u>Title page,</u>
Item [73], is corrected to read as follows:

-- [73]   Assignee:      Aisin Seiki Kabushiki Kaisha, Kariya (JP) --

Signed and Sealed this

Fifteenth Day of April, 2003

JAMES E. ROGAN
*Director of the United States Patent and Trademark Office*